US009332467B2

(12) United States Patent
Keller et al.

(10) Patent No.: US 9,332,467 B2
(45) Date of Patent: May 3, 2016

(54) SRVCC HANDOVER OF CALLS BETWEEN ACCESS NETWORKS WITH EFFICIENT MEDIA GATEWAY SELECTION

(75) Inventors: Ralf Keller, Würselen (DE); Fredrik Lindholm, Stockholm (SE); Kari-Pekka Perttula, Espoo (FI); Karl-Peter Ranke, Herzogenrath (DE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 25 days.

(21) Appl. No.: 14/391,198

(22) PCT Filed: Jun. 13, 2012

(86) PCT No.: PCT/EP2012/061231
§ 371 (c)(1),
(2), (4) Date: Oct. 30, 2014

(87) PCT Pub. No.: WO2013/156089
PCT Pub. Date: Oct. 24, 2013

(65) Prior Publication Data
US 2015/0063299 A1 Mar. 5, 2015

(30) Foreign Application Priority Data

Apr. 17, 2012 (WO) ................. PCT/EP2012/057025

(51) Int. Cl.
*H04W 36/08* (2009.01)
*H04W 36/00* (2009.01)
(Continued)

(52) U.S. Cl.
CPC .......... *H04W 36/08* (2013.01); *H04W 36/0022* (2013.01); *H04W 72/048* (2013.01); *H04W 76/02* (2013.01); *H04W 76/026* (2013.01); *H04W 88/16* (2013.01)

(58) Field of Classification Search
None
See application file for complete search history.

(56) References Cited

U.S. PATENT DOCUMENTS 8,670,411 B2 * 3/2014 Xie ..................... H04W 36/385
370/331
8,675,607 B2 * 3/2014 Stenfelt ............ H04W 36/0022
370/331
(Continued)

FOREIGN PATENT DOCUMENTS

EP 2343922 A1 7/2010
WO 2011098137 A1 8/2011
(Continued)

OTHER PUBLICATIONS

3rd Generation Partnership Project, "3rd Generation Partnership Project; Technical Specification Group Services and System Aspects; Single Radio Voice Call Continuity (SRVCC); Stage 2 (Release 11)", Technical Specification, 3GPP TS 23.216 V 11.4.0, Mar. 1, 2012, pp. 1-64, 3GPP, France.
(Continued)

*Primary Examiner* — Brian Roberts
(74) *Attorney, Agent, or Firm* — Coats & Bennett, PLLC

(57) ABSTRACT

A mechanism is presented for performing a session transfer with Single Radio Voice Call Continuity, SRVCC, from a Packet Switched, PS, access to a Circuit Switched, CS, access of a telecommunications session that has been established over the PS access via an IP Multimedia Subsystem, IMS, network. The method includes receiving a request for the transfer of the session to the CS access. An indication of an already-seized media gateway, MGW, that has been established for use in one or more other sessions over the CS access is obtained from the IMS network. A MGW is selected as a Mobile-Media Gateway, M-MGW, for the session based on the obtained indication. Allocation of resources for the session in the CS access network is initiated, including specifying the MGW to be used as the Mobile-Media Gateway, M-MGW. Transfer of the session to the CS access is then initiated.

12 Claims, 4 Drawing Sheets

(51) Int. Cl.
*H04W 72/04* (2009.01)
*H04W 88/16* (2009.01)
*H04W 76/02* (2009.01)

(56) References Cited

U.S. PATENT DOCUMENTS

| | | | |
|---|---|---|---|
| 8,923,247 B2* | 12/2014 | Keller | H04W 36/14 370/331 |
| 2010/0040020 A1* | 2/2010 | Chen | H04W 36/0022 370/331 |
| 2011/0188451 A1* | 8/2011 | Song | H04W 36/0033 370/328 |
| 2012/0044867 A1 | 2/2012 | Faccin et al. | |

FOREIGN PATENT DOCUMENTS

| | | |
|---|---|---|
| WO | 2011098149 A1 | 8/2011 |
| WO | 2011160928 A1 | 12/2011 |

OTHER PUBLICATIONS

Nokia Siemens Networks, et al., "eMPS for SRVCC on IMS level", Change Request, 3GPP TSG-SA2 Meeting #86, Naantali, Finland, Jul. 5, 2011, pp. 1-8, S2-113539, 3GPP.

3rd Generation Partnership Project, "3rd Generation Partnership Project; Technical Specification Group Services and System Aspects; Single Radio Voice Call Continuity (SRVCC), Stage 2 (Release 11)", Technical Specification, 3GPP TS 23.216, Version 11.2.0, Sep. 2011, pp. 1-53, France.

3rd Generation Partnership Project, "3rd Generation Partnership Project; Technical Specification Group Services and System Aspects; IP Multimedia Subsystem (IMS), Stage 2 (Release 11)", Technical Specification, 3GPP TS 23.228, Version 11.2.0 Sep. 2011, pp. 1-274, France.

3rd Generation Partnership Project, "3rd Generation Partnership Project; Technical Specification Group Services and System Aspects; IP Multimedia Subsystem (IMS) Service Continuity, Stage 2 Release 11", Technical Specification, 3GPP TS 23.237, Version 11.2.0, Sep. 2011, pp. 1-154, France.

* cited by examiner

SRVCC HANDOVER OF CALLS BETWEEN ACCESS NETWORKS WITH EFFICIENT MEDIA GATEWAY SELECTION

TECHNICAL FIELD

The present invention relates to methods and apparatus in a telecommunications network for improving selection of a Media Gateway (MGW) at handover of a call from a Packet Switched (PS) access network to a Circuit Switched (CS) access network. More particularly, the invention relates to a handover with Single Radio Voice Call Continuity (SRVCC).

BACKGROUND

IP Multimedia services provide a dynamic combination of voice, video, messaging, data, etc, within the same session. This has lead to a growth in the numbers of basic applications and the media which it is possible to combine, leading to a growth in the number and variety of services offered to the end users—so-called "combinational IP Multimedia" services.

IP Multimedia Subsystem (IMS) is the technology defined by the Third Generation Partnership Project (3GPP) to provide Internet Protocol (IP) Multimedia services over mobile communication networks. IMS provides key features to enrich the end-user communication experience through the integration and interaction of services both person-to-person (client-to-client) as well as person-to-content (client-to-server) communications over an IP-based network. The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session.

FIG. 1 illustrates schematically how the IMS fits into the mobile network architecture in the case of a General Packet Radio Service (GPRS) access network. Although numerous network entities, or nodes are depicted, only those relevant to the present discussion have been assigned reference numerals. As shown in FIG. 1 control of communications occurs at three layers (or planes). The lowest layer is the Connectivity Layer 1, also referred to as the bearer plane and through which signals are directed to/from user equipment (UE) accessing the network. The entities within the connectivity layer 1 that connect an IMS subscriber to IMS services form a network that is referred to as the IP-Connectivity Access Network (IP-CAN). The GPRS network includes various GPRS Support Nodes (GSNs). The middle layer is the Control Layer 4, and at the top is the Application Layer 6. Media Gateways (MGWs) 10 provide a translation function that converts media streams between networks operating different technologies or with different transport protocols.

The IMS 3 includes a core network 3a, which operates over the middle, Control Layer 4 and the Connectivity Layer 1, and a Service Network 3b. The IMS core network 3a includes nodes that send/receive signals to/from the GPRS network via the GGSN 2 at the Connectivity Layer 1 and network nodes that include Call/Session Control Functions (CSCFs) 5. The CSCFs 5 operate as SIP proxies within the IMS in the middle, Control Layer 4. Other IMS core network entities shown include a Media Resource Function Controller (MRFC), a Border Gateway Control Function BGCF and a Media Gateway Control Function, (MGCF). The IMS also includes a Home Subscriber Server (HSS) 5a, which supports the IMS nodes that handle calls and performs authentication and authorization of the user. The top, Application Layer 6 includes the IMS service network 3b. Application Servers (aSs) 7 are provided for implementing IMS service functionality.

As shown in FIG. 1, User Equipment (UE) can access the IMS by attaching to an access network and then over the Connectivity Layer 1, which is part of a PS domain. If the UE attaches to the network via a PS access network, such as a 3GPP Long Term Evolution (LTE) access network, an IMS session can be set up by the UE using SIP signalling. However, many existing access networks operate only using CS technology, and a UE may also access IMS services via a CS domain 8. Although the CS domain 8 will not handle SIP, procedures are well established for dealing with the provision of media and services between the IMS and a UE using a CS access. In a CS access, A UE attaches via a Radio Access Network (RAN—such as a Global System for Mobile Communications (GSM) Edge RAN, GERAN), which is communicatively coupled to a Mobile Switching Centre (MSC) Server 9.

There are many occasions when during a call/session it is required to transfer or hand over the call/session from one access network to another. There are a variety of factors that are used to determine when a call needs to be handed over to another access network, but these are not particularly relevant to the present discussion. Generally, the access network determines, based on the cells for which the UE reports measurements, when the conditions arise that require a request to be made to the core network for the call to be handed over.

Single Radio Voice Call Continuity (SRVCC) is described in 3GPP TS 23.237 V11.2.0 (2011-09), referred to hereafter as TS 23.237, and 3GPP TS 23.216 V11.2.0 (2011-09), referred to hereafter as TS 23.216. These specify procedures for handover of a call from a PS access to a CS access (e.g. transfer of a Voice-over-IP, VoIP, IMS session from an evolved Universal Mobile Telecommunications System (UMTS) Terrestrial RAN, E-UTRAN, to a UTRAN/GERAN).

When a UE performs a SRVCC handover, the MSC Server 9 performs certain actions related to allocation of resources for the call in the target CS access network (i.e. in a Base Station Controller, BSC or a Radio Network Controller RNC), which it needs to do before it starts interacting with the IMS. For example, a codec is selected for the call during the CS access. Although the MSC Server 9 also obtains information from a Mobile Management Entity (MME) on the codecs supported by the UE, it does not know which of these supported codecs is actually being used by the UE on the PS access (e.g. LTE or High Speed Packet Access, HSPA). This may result in a different codec being selected for the session on the CS access than was being used on the PS access. As a consequence there may be degradation of the speech quality, and inefficient use of resources, due to transcoding that has to be performed by a MGW after the SRVCC handover.

Another problem that arises with current procedures is that the MSC Server 9 seizes a Mobile-Media Gateway (M-MGW) that it will use for the call. Other Media Gateways (MGWs) may also be seized (or allocated), for example the Access Transfer Control Function (ATCF)—an IMS entity that controls access transfers—may seize an Access Transfer Gateway (ATGW), and in roaming scenarios the Interconnection Border Control Function (IBCF) may seize a Transition Gateway (TrGW), which is yet another gateway node. The seizing of all these separate nodes is inefficient and sub-optimal, especially as they all perform the same basic functions (with only a few differences). In the following discussion, the term MGW is used to refer generally to any of these nodes, except where there is a specific need to differentiate between the roles, where the individual gateway names, M-MGW, ATGW or TrGW, will be used.

SUMMARY

A first aspect provides a method of performing a session transfer with Single Radio Voice Call Continuity, SRVCC, from a Packet Switched, PS, access to a Circuit Switched, CS, access of a telecommunications session that has been established over the PS access via an IP Multimedia Subsystem, IMS, network. The method includes receiving a request for the transfer of the session to the CS access. An indication of an already-seized media gateway, MGW, that has been established for use in one or more other sessions over the CS access is obtained from the IMS network. A MGW is selected as a Mobile-Media Gateway, M-MGW, for the session based on the obtained indication. Allocation of resources for the session in the CS access network is initiated, including specifying the MGW to be used as the Mobile-Media Gateway, M-MGW. transfer of the session to the CS access is then initiated.

A second aspect provides a Mobile Switching Centre, MSC, server of a telecommunications network. The MSC server includes an input/output for sending and receiving messages to/from other network entities, a memory storing data and programming instructions, and a processor. The processor implements the programming instructions to action a Single Radio Voice Call Continuity, SRVCC request for transfer of a session established over a Packet Switched, PS, access via an IP Multimedia Subsystem, IMS, network to a Circuit Switched, CS, access. This includes obtaining from the IMS network an indication of an already-seized media gateway, MGW, that has been established for use in one or more other sessions over the CS access and selecting a MGW as a Mobile-Media Gateway, M-MGW, for the session based on the obtained indication. The processor also implements programming instructions to initiate allocation of resources for the session in the CS access network, including specifying the MGW to be used as the M-MGW, and to initiate transfer of the session to the CS access.

In other words, when the Mobile Switching Centre (MSC) server receives the PS to CS handover Request it obtains (e.g. from the Access Transfer Control Function, ATCF) an indication of any already seized MGWs being used for the CS access. For example, the ATCF may provide the identity of a currently used Access transfer Gateway (ATGW), or an indication of a Transition Gateway (TrGW) already allocated to an Interconnection Border Control Function (IBCF). The ATGW and TrGW may be the same MGW. This may be in addition to information about the currently used voice codec, and other media information provided to the MSC such as payload type numbers used in RTP. The MSC may obtain the information by querying the IMS, or by sending the session transfer request early and obtaining the information in the response, so that it can then determine the best MGW to use for the transferred call. In addition, the MSC may specify the codec to be used when initiating the transfer.

Other aspects include a computer program for programming a computer in a network, and a computer program product comprising instructions for enabling a computer in a network to implement this methodology.

DETAILED DESCRIPTION

Figure 1:
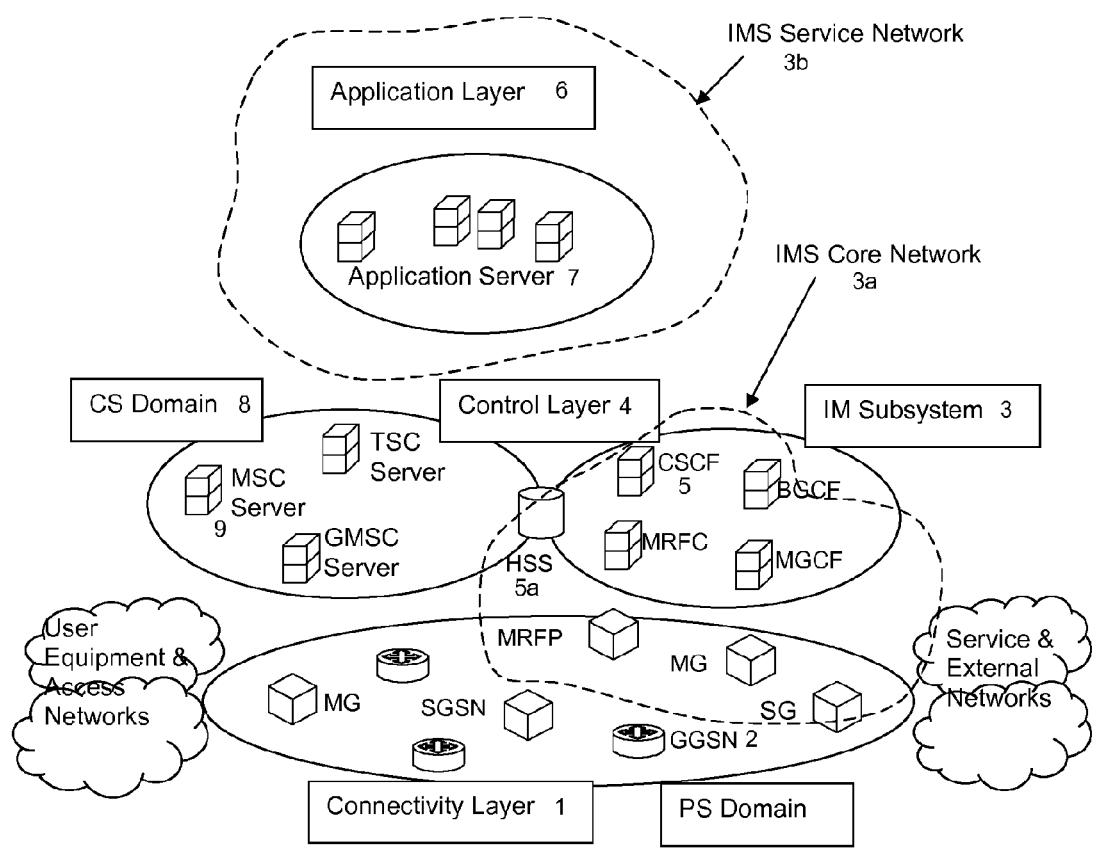
FIG. 1 is a schematic illustration showing how the IMS fits into the mobile network architecture in the case of a GPRS access network.
Figure 2:
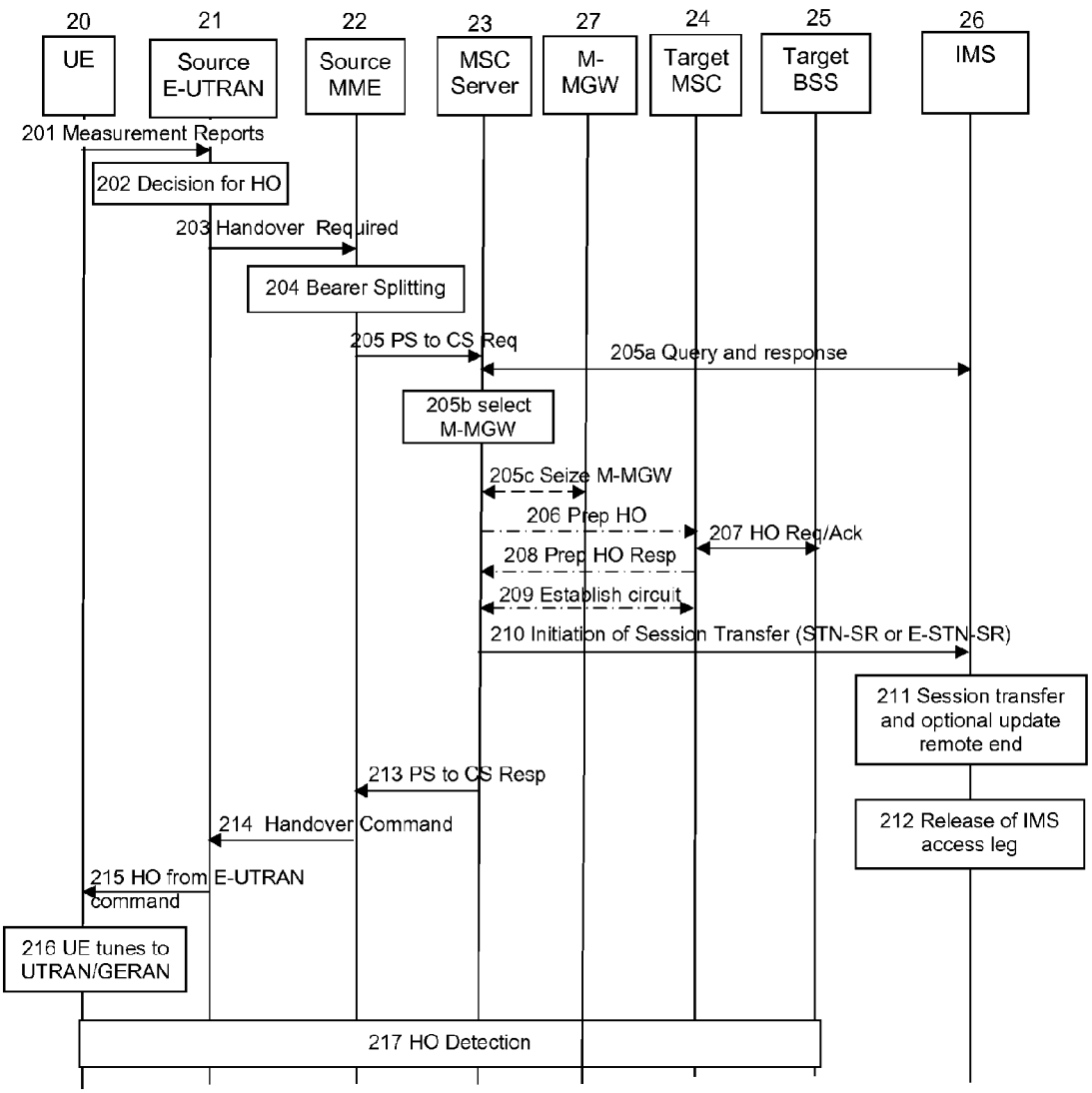
FIG. 2 is a signal diagram of part of one embodiment of a SRVCC handover procedure.

Referring to FIG. 2, this illustrates the signalling involved in part of a Single Radio Voice Call Continuity (SRVCC) handover procedure for a first embodiment. In this embodiment, the indication of any already-seized Media Gateways (MGWs), and optionally codec information, is obtained by a Mobile Switching Centre (MSC) server 23 sending a query to the IMS 26. An M-MGW 27 is an MGW that the MSC server will select for the CS access. The other entities shown include a User Entity (UE) 20 which is engaged in a call and is accessing the IMS 26 via a PS radio access network (RAN), which in this case is an evolved Universal Mobile Telecommunications System (UMTS) Terrestrial RAN, E-UTRAN E-UTRAN, designated as the Source E-UTRAN 21. Mobility management is handled by a Source Mobility Management Entity (MME) 22. Also shown are a target MSC 24 and a target Base Station Server (BSS) 25 in the target CS access network to which the call will be transferred in a SRVCC handover. The example signal flow shown in FIG. 2 is for transfer to a GSM Edge RAN (GERAN) without Dual Transfer Mode (DTM). However, the same principles can be applied to other call cases as documented in TS 23.216.

Signals 201 to 205 are the same as specified in TS 23.216. Briefly, signal(s) 201 represent measurement reports sent from the UE 20 to the source E-UTRAN 21, and based on which the E-UTRAN 21 decides at step 202 to request a SRVCC handover. The Source E-UTRAN 21 sends a SRVCC Handover Required message 203 to the source MME 22 to request the handover. This Handover Required message 203 includes an ID of the target GERAN (CS access network) to which the call is to be transferred and indicates to the MME 22 that this is a SRVCC handover operation only towards a CS domain. At step 204 the source MME 22 splits the voice bearer from the non-voice bearers. The source MME 22 initiates the PS-CS handover procedure for the voice bearer only by sending a SRVCC PS to CS Request message 205 to the MSC Server 23. This message 205 also includes information about the call, including the International Mobile Subscriber Identity (IMSI), the Correlation Mobile Subscriber Integrated Services Digital Network Number (C-MSISDN), the Session Transfer Number for SRVCC (STN-SR), and supported codecs.

Now the MSC Server 23 exchanges a query and response 205a with the IMS 26 (e.g. an ATCF or a Service Centralisation and Continuity AS—SCC AS in the IMS 26). Using the information received from the MME 22 (IMSI, C-MSISDN, STN-SR, supported codecs) the query 205a requests provision of information that includes an indication of (i.e. the identity of) any already seized MGW (i.e. an MGW that is currently active in relation to calls over the CS access). In general, unless it is the first time that a handover request is being handled by a particular ATCF, then the ATCF will have already seized an ATGW during the initial call setup when the call was established over the PS access, and so it will at least provide an indication of this in its response to the query. The query 205a may also request provision of information identifying the currently used codec, as well as other information that the MSC Server 23 may require relating to the session media, such as payload type number to be used in the Real-time Transport Protocol (RTP). The query 205*a* may be, for example, a SIP MESSAGE or SIP INFO. The IMS 26 (ATCF/SCC AS) handles this request with priority and responds as quickly as possible. The priority may be determined based on the content of the query or by an additional priority indicator in the query message 205*a*.

From the query response, the MSC server 23 is informed about any already seized MGW and at step 205*b* the MSC server 23 then uses this information to determine an appropriate MGW to select as the Mobile-Media Gateway (M-MGW) 27 for the transferred call on the CS access. This may be the (or one of the) MGW(s) identified in the query response. However, the MSC server 23 may also determine that it would be better to use a different MGW, for example to optimise the media routing. The MSC server 23 may also determine the codec that needs to be used for the CS access based on information provided in the query response, and may use any other information it has requested, such as the payload type numbers, to determine the resources to be allocated for the call over the CS access. The MSC server 23 uses this information in the subsequent procedure, as shown in signals 206 to 217, which essentially follow the standard procedure subject to the following additional indications.

The MSC Server 23 converts the PS to CS handover request 205 into a CS inter-MSC handover request by sending a Prepare Handover Request message 206 to the target MSC 24. At this point, at step 205*c*, the MSC Server 23, based on its determination at step 205*b* of the appropriate MGW to use as the M-MGW either seizes a new MGW or an already-seized MGW that it was informed about in response to the query 205*a*. The Prepare Handover Request message 206 may also include an indication of the voice codec that was provided in the query response at 205*a*. The Target MSC 24 performs resource allocation with the Target BSS 25 by exchanging Handover Request/Acknowledge messages 207. At this point, the Target BSS 25 is also informed of the codec to be used. Signals 208 and 209 follow the standard procedure in which the Target MSC 24 sends a Prepare Handover Response message 208 to the MSC Server 23, and in signal exchange 209 a circuit connection is established between the target MSC and the MGW associated with the MSC Server 23.

In signal 210 the MSC Server 23 initiates the transfer of the session by sending a SIP INVITE message towards the IMS 26 using, for a non-emergency session, the STN-SR, or for an emergency session the Emergency STN-SR (E-STN-SR). Provided that appropriate resources could be allocated in step 207, signal 210 includes, in the Session Description, information of the codec to be used, as obtained in step 205*a*, as well as other information relating to the session. This information is required for the session set-up procedure. In this case, the information is also required because, in the SDP where the codec is specified, other parameters from the MSC Server/MGW 23 are also required, such as the IP address and port to be used for the MSC Server/MGW 23. Thus, the Invite 210 with SDP (and codec) confirms to the IMS 26 that the transfer is taking place, and includes other information that the IMS 26 does not yet know about (such as IP address/ports).

The remaining signals follow the standard procedure, in which at step 211 the remote end is updated with the SDP of the CS access leg, and the downlink flow of the voice media is switched to the CS access leg. At step 212 the source IMS access leg is released. Signal 213 is a SRVCC PS to CS Response message sent from the MSC Server 23 to the Source MME 22. Signal 214 is a Handover Command message sent from the Source MME 22 to the Source E-UTRAN 21, which includes information about the voice media component only. Signal 215 is a Handover from E-UTRAN Command message sent from the Source E-UTRAN 21 to the UE 20. At step 216 the UE 20 tunes to the GERAN. At step 217, the handover is detected by the network entities and the procedure continues to its conclusion as defined in the standard.

Figure 3:
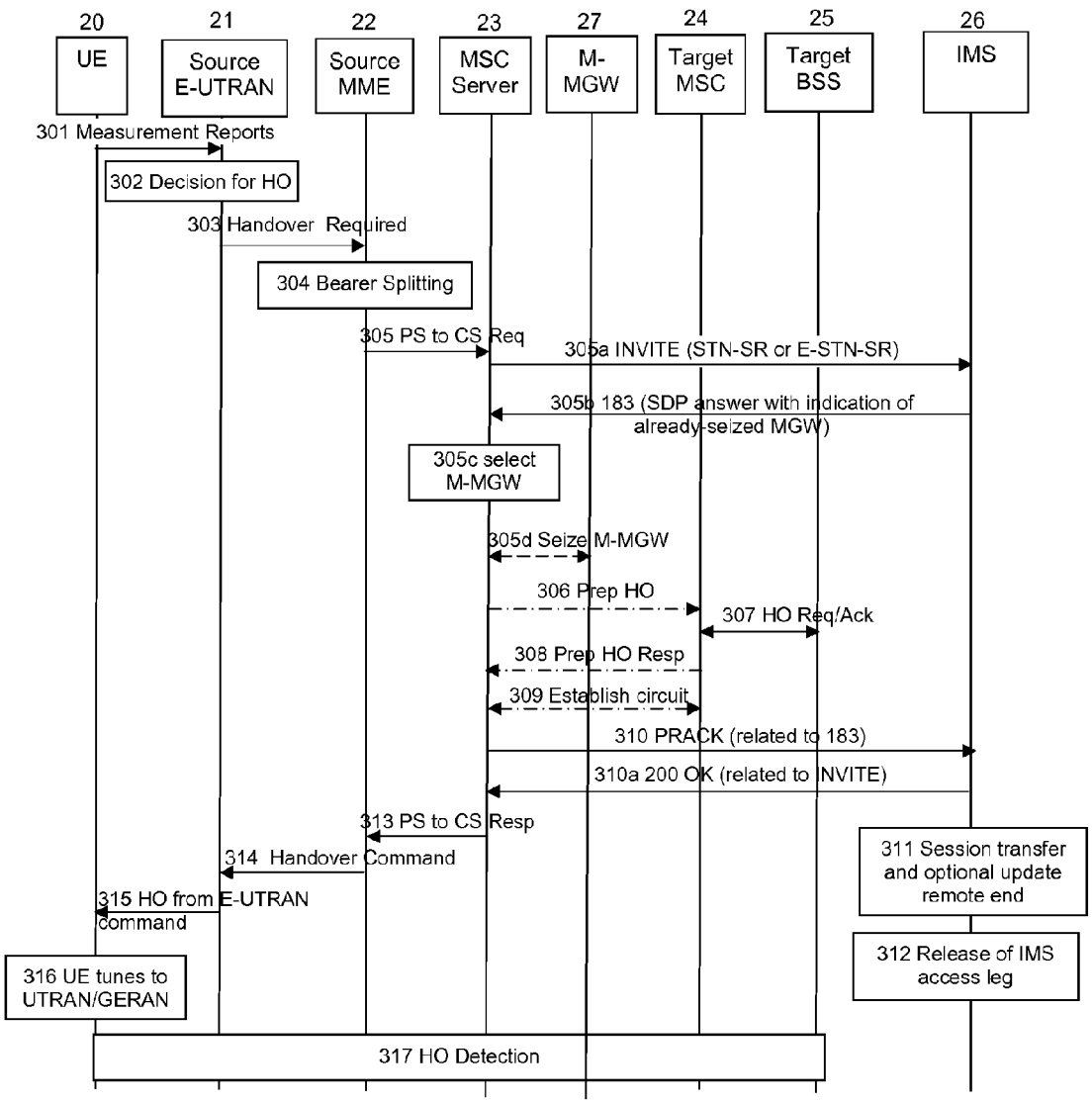
FIG. 3 is a signal diagram of part of another embodiment of a SRVCC handover procedure.

Referring to FIG. 3, this illustrates the signalling involved in part of a SRVCC handover procedure for a second embodiment. The same network entities are involved as in the embodiment of FIG. 2. In this embodiment, the indication of any already seized MGWs, optionally as well as codec information, is obtained by the MSC server 23 in response to an early initiation of the session transfer. For this to occur, the entity (ATCF or SCC-AS) in the IMS 26 needs to be configured to reply with a provisional response to the session initiation request (SIP INVITE).

Signals 301 to 305 follow the standard and are the same as described above for FIG. 2. Now, in signal 305*a*, the MSC Server 23 starts the session transfer procedure by sending the INVITE (equivalent to signal 210 in the FIG. 2 embodiment) using the information it received from the Source MME 22 (IMSI, C-MSISDN, STN-SR). Because at this stage the MSC server will not yet have selected a MGW as the M-MGW for the transferred call, the INVITE may be an empty Invite without any SDP information. The ATCF/SCC AS in the IMS 26 handles this request with priority and responds as quickly as possible with a provisional response (a SIP 183 message) 305*b*. As with the first embodiment described above, the priority may be determined based on the content of the query or by an additional priority indicator in the Invite message 305*a*. The 183 response 305*b* includes an indication (and identities) of one (or more) already seized MGWs.

The 183 response 305*b* may also include information about the codec and any other required information such as the payload types. The IMS 26 remote end selects the most suitable codec. The remote end is the next node that handles media related interactions, and may, for example, be the ATCF (controlling the ATGW) or an MGCF (controlling an IM MGW). If there are no media gateways on the media path, then the remote end can also be a terminal. If the codec already used in the (PS access) session exists for the CS access, this codec will be selected and used in the 183 response 305*b*. If the INIVITE 305*a* from the MSC did not include SDP information, the IMS 26 entity (ATCF/SCC AS) will include an SDP offer in the 183 message 305*b* with appropriate SDP for the currently ongoing session.

The MSC Server 23 waits for the 183 response 305*b* and then, at step 305*c*, decides whether to use the MGW that was indicated in the response (or one of the MGWs if more than one was indicated) as the M-MGW 27 it selects for the call over the CS access. At this point, at step 305*d*, the MSC Server 23, based on its determination at step 305*c* of the appropriate MGW to use as the M-MGW 27, either seizes a new MGW or an already-seized MGW that it was informed about in response 305*b*. Note that if the 183 response is sent by the ATCF, then it is likely that the indicated MGW will be the ATGW already seized by the ATCF, and could also be functioning as a TrGW. However, the MSC Server 23 could select a different MGW instead, especially if the different MGW resulted in better optimisation of media routing. The MSC Server 23 may also determine the codec to be used in the CS access and the payload types used in RTP before proceeding with the handover request at signal 306.

Signals 306 to 309 are the same as signals 206 to 209 of the first embodiment. Thus, the Prepare Handover Request message 306 sent from the MSC server 23 to the target MSC 24 includes an indication of the selected M-MGW, and (optionally) the voice codec that was provided in the 183 response 305b. Also, when the Target MSC 24 performs resource allocation with the Target BSS 25 by exchanging Handover Request/Acknowledge messages 307, the Target BSS 25 is informed of the M-MGW and codec to be used.

When the MSC server 23 is ready to have the session media transferred to the CS access, e.g. after signal 309, it sends the PRACK acknowledgement message 310 (related to the SIP 183 message 305b) to the IMS 26. This is done to confirm the selected M-MGW and codec and initiate the transfer of the media. If resources could not be granted in the RAN by previous steps (306-309), the MSC Server 23 sends a CANCEL message to abort the session transfer. Otherwise, the IMS 26 responds with a SIP 200 OK message 310a (related to the INVITE 305a) when the media has been transferred.

The remainder of the procedure steps/signals 311-317 follow the standard and are the same as steps/signals 211-217 described above for the first embodiment.

Note that the procedures described above refer principally to selecting the MGW for the transferred call, although details of how the procedure allows selection of an appropriate codec are also included. These are perceived as being the major advantages of the new procedures. However, it should be noted that the SDP in the SIP messages (such as INVITE) used in the call set-up and handover procedures can include a large number of parameters. There will often be other media related information that is required or is advantageous to include.

Figure 4:
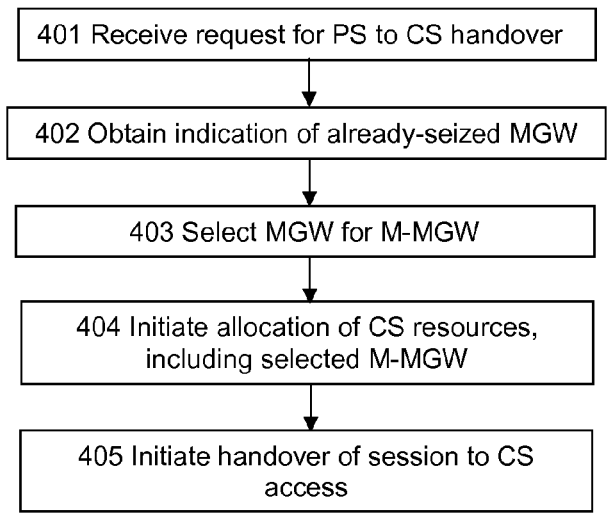
FIG. 4 is a flow diagram illustrating a series of steps in a SRVCC handover method.

FIG. 4 is a flow diagram illustrating the principal method steps involved. At step 401 a request is received for a SRVCC, PS to CS handover of a call. At step 402, an indication of an already-seized MGW is obtained from the IMS. As described above other media parameters may also be obtained at this step. At step 403 the MGW to be used as the M-MGW for the call is selected. The selection is made based on the obtained indication of the already-seized MGW (although a different MGW may eventually be selected, if other reasons dictate). At step 404, the procedure for allocating resources for the CS access is initiated, and this includes the selected M-MGW. Finally, at step 404, transfer of the session to the CS access, is initiated.

Figure 5:
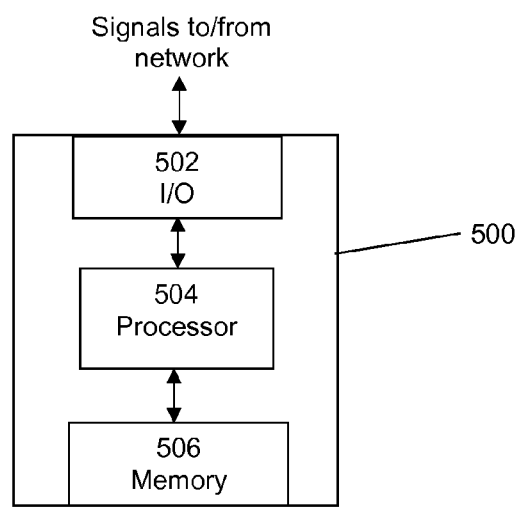
FIG. 5 is a schematic block diagram showing functional components in a network entity.

FIG. 5 is a schematic block diagram illustrating the principal functional entities of a MSC server 500 configured to implement the new procedures described above. The MSC server 500 includes an input/output 502 for sending and receiving messages to/from other network entities. A memory 506 stores data and programming instructions. A processor 504 implements the programming instructions such that when a request for a SRVCC handover of a session, established over a PS access via an IMS network, is received, the MSC server 500 obtains from the IMS network an indication of an already-seized MGW that has been established for use in one or more other sessions over the CS access. The MSC server 500 is programmed to select a MGW as a M-MGW for the session based on the obtained indication, and to initiate the allocation of resources for the session in the CS access network by specifying the MGW to be used as the M-MGW. The MSC server 500 also initiates transfer of the session to the CS access.

From the above it will be apparent that the following new procedures have been introduced: a new procedure to communicate with the IMS (ATCF/SCC AS) prior to resource establishment in the CS access network; and an active decision to select the MGW to use as the M-MGW. Advantageously, this can be the same MGW (ATGW, TrGW) as being used by the ATCF.

It is an advantage that, when the session transfer takes place, only one physical MGW needs to be used, resulting in a reduction in signalling and processing requirements. Also, the same mechanisms can be employed for obtaining information about the codec being used (and additional media parameters such as payload type) between the accesses, allowing selection of a common codec for both CS and PS accesses. This allows use of the best possible codec, and ensures that the transferred session can proceed without the need for transcoding.

The invention claims is:

1. A method of performing a session transfer with Single Radio Voice Call Continuity (SRVCC) from a Packet Switched (PS) access to a Circuit Switched (CS) access of a telecommunications session that has been established over the PS access via an IP Multimedia Subsystem (IMS) network, the method comprising:
    receiving a request for the transfer of the session to the CS access;
    obtaining, from the IMS network, an indication of an already-seized media gateway (MGW) that has been established for use in one or more other sessions over the CS access;
    selecting a MGW as a Mobile-Media Gateway (M-MGW) for the session based on the obtained indication;
    initiating allocation of resources for the session in the CS access network, including specifying the MGW to be used as the M-MGW;
    initiating transfer of the session to the CS access.

2. The method of claim 1, wherein obtaining the indication of the already-seized MGW comprises sending a query to the IMS requesting provision of information that includes the already-seized MGW indication.

3. The method of claim 2:
    wherein the IMS responds to the query by providing the requested already-seized MGW indication;
    wherein the IMS prioritizes the response to ensure it is provided as quickly as possible.

4. The method of claim 3, wherein the query includes a priority indicator to trigger prioritization of the response by the IMS.

5. The method of claim 1, wherein obtaining the MGW indication comprises:
    initiating the session transfer using a Session Initiation Protocol signal sent to the IMS; and
    receiving a provisional response from the IMS comprising a Session Description with the already-seized MGW indication.

6. The method of preceding claim 1, wherein the obtaining the indication of the already-seized MGW comprises obtaining the indication of the already-seized MGW from one of:
    an Access Transfer Control Function;
    a Service Centralization and Continuity Application Server;
    an Emergency Access Transfer Function.

7. The method of claim 1, wherein the already seized MGW is an Access Transfer Gateway and/or a Transition Gateway.

8. The method of claim 1, wherein the obtaining the indication of the already-seized MGW from the IMS comprises obtaining an indication of a currently used voice codec in the session.

9. The method of claim 8, wherein the obtaining the indication of the already-seized MGW further comprises obtaining information relating to the media currently being used.

10. The method of claim 9, wherein the information relating to the media currently being used comprises one or more of:
bandwidth parameters;
codec mode set of operation;
payload type;
payload type numbers.

11. A Mobile Switching Center (MSC) server of a telecommunications network, the MSC server comprising:
an input/output configured to send to and receive messages from other network entities;
memory storing data and programming instructions;
one or more processing circuits configured to implement the programming instructions to handle a Single Radio Voice Call Continuity (SRVCC) request for transfer of a session established over a Packet Switched (PS) access via an IP Multimedia Subsystem (IMS) network to a Circuit Switched (CS) access by:
obtaining, from the IMS network, an indication of an already-seized media gateway (MGW) that has been established for use in one or more other sessions over the CS access;
selecting a MGW as a Mobile-Media Gateway (M-MGW) for the session based on the obtained indication;
initiating allocation of resources for the session in the CS access network, including specifying the MGW to be used as the M-MGW;
initiating transfer of the session to the CS access.

12. A computer program product stored in a non-transitory computer readable medium for programming a computer in a network to handle a request for transfer of a session established over a Packet Switched (PS) access via an IP Multimedia Subsystem (IMS) network to a Circuit Switched (CS) access with Single Radio Voice Call Continuity (SRVCC); the computer program product comprising software instructions which, when run on one or more processors of the computer, causes the computer to:
obtain, from the IMS network, an indication of an already-seized media gateway (MGW) that has been established for use in one or more other sessions over the CS access;
select a MGW as a Mobile-Media Gateway (M-MGW) for the session based on the obtained indication;
initiate allocation of resources for the session in the CS access network, including specifying the MGW to be used as the M-MGW;
initiate transfer of the session to the CS access.

* * * * *